United States Patent
Suzuki et al.

(10) Patent No.: US 10,486,784 B2
(45) Date of Patent: Nov. 26, 2019

(54) ROTATING ELECTRICAL MACHINE APPARATUS

(71) Applicant: YAMAHA HATSUDOKI KABUSHIKI KAISHA, Shizuoka-ken (JP)

(72) Inventors: Takayoshi Suzuki, Shizuoka-ken (JP); Ryoma Matsuo, Tokyo (JP); Satoshi Ishikawa, Shizuoka-ken (JP); Noriyoshi Hiraoka, Shizuoka-ken (JP)

(73) Assignee: YAMAHA HATSUDOKI KABUSHIKI KAISHA, Shizuoka-Ken (JP)

( * ) Notice: Subject to any disclaimer, the term of this patent is extended or adjusted under 35 U.S.C. 154(b) by 689 days.

(21) Appl. No.: 14/973,402

(22) Filed: Dec. 17, 2015

(65) Prior Publication Data

US 2016/0185431 A1    Jun. 30, 2016

(30) Foreign Application Priority Data

Dec. 24, 2014  (JP) .................. 2014-259755

(51) Int. Cl.
| | | |
|---|---|---|
| B63H 1/16 | (2006.01) | |
| F03B 3/12 | (2006.01) | |
| B63H 1/28 | (2006.01) | |
| F04D 13/08 | (2006.01) | |
| F04D 13/06 | (2006.01) | |

(Continued)

(52) U.S. Cl.
CPC ............. *B63H 1/16* (2013.01); *B63H 1/28* (2013.01); *B63H 20/007* (2013.01); *F03B 3/126* (2013.01); *F04D 13/0666* (2013.01); *F04D 13/086* (2013.01); *H02K 7/14* (2013.01); *H02K 7/1823* (2013.01); *H02K 19/06* (2013.01);

(Continued)

(58) Field of Classification Search
CPC .... F03B 3/04; F03B 13/10; F03B 3/12; F03B 3/121; F03B 3/126; F03B 3/16; F05B 2220/20; F04D 13/08; F04D 13/0666; F04D 13/086; H02K 16/04; H02K 16/00; B63H 1/16; B63H 1/28; B63H 1/14; B63H 2001/165

See application file for complete search history.

(56) References Cited

U.S. PATENT DOCUMENTS 2,652,505 A    9/1953  Matheisel
3,708,251 A *  1/1973  Pierro .................... B63H 5/125
                                                     310/263

(Continued)

FOREIGN PATENT DOCUMENTS

| DE | 688114 C | 2/1940 |
|---|---|---|
| EP | 1840025 | * 3/2007 |

(Continued)

OTHER PUBLICATIONS

Extended European Search Report dated May 13, 2016.

*Primary Examiner* — Bryan M Lettman
(74) *Attorney, Agent, or Firm* — Rabin & Berdo, P.C.

(57) ABSTRACT

In a rotating electrical machine apparatus, a rotor portion provided in a cylindrical portion and a stator portion provided in a recessed portion in which the rotor portion is housed are aligned along the rotation axis of a rim such that a force is generated in a direction opposite to the direction of a load that acts along the rotation axis of the rim of loads that act on the rim following rotation of a blade.

17 Claims, 6 Drawing Sheets

(51) Int. Cl.
*H02K 7/14* (2006.01)
*B63H 20/00* (2006.01)
*H02K 19/24* (2006.01)
*H02K 7/18* (2006.01)
*H02K 19/06* (2006.01)
*H02K 19/10* (2006.01)

(52) U.S. Cl.
CPC ........... *H02K 19/103* (2013.01); *H02K 19/24* (2013.01); *B63H 2001/165* (2013.01); *F05B 2220/20* (2013.01)

(56) References Cited

U.S. PATENT DOCUMENTS

| | | | | |
|---|---|---|---|---|
| 4,720,640 | A | | 1/1988 | Anderson et al. |
| 5,220,231 | A | * | 6/1993 | Veronesi ................. B63H 1/16 310/90 |
| 5,252,875 | A | * | 10/1993 | Veronesi ................. B63H 1/16 310/114 |
| 5,306,183 | A | * | 4/1994 | Holt ........................ B63H 5/14 310/114 |
| 5,982,070 | A | * | 11/1999 | Caamano ................. H02K 1/02 29/596 |
| 7,471,009 | B2 | * | 12/2008 | Davis ...................... F03B 3/128 290/54 |
| 8,310,077 | B2 | * | 11/2012 | Pearce .................. F03B 13/264 290/54 |
| 9,227,709 | B1 | * | 1/2016 | Schill ....................... B63G 8/16 |
| 2010/0007225 | A1 | * | 1/2010 | Platon ...................... H02K 1/14 310/45 |
| 2012/0093669 | A1 | * | 4/2012 | Gieras .................... B63H 23/24 417/423.3 |
| 2013/0115832 | A1 | | 5/2013 | Suzuki et al. |
| 2014/0205467 | A1 | * | 7/2014 | Yanai ...................... F04B 35/04 417/53 |

FOREIGN PATENT DOCUMENTS

| | | |
|---|---|---|
| JP | S56-027366 U | 3/1981 |
| JP | S62-006892 A | 1/1987 |
| JP | 2007-245948 A | 9/2007 |
| JP | 2013-100013 A | 5/2013 |
| JP | 2013-100014 A | 5/2013 |

\* cited by examiner

FIG.4
FIRST EMBODIMENT (PROPULSION DEVICE)

FIG.6  FIRST MODIFICATION (GENERATOR)

FIG.7  SECOND EMBODIMENT (PROPULSION DEVICE)

FIG.8  SECOND MODIFICATION (GENERATOR)

FIG.9  THIRD EMBODIMENT (PROPULSION DEVICE)

FIG.10 THIRD MODIFICATION (GENERATOR)

FIG.11 FOURTH EMBODIMENT (PROPULSION DEVICE)

FIG.12 FOURTH MODIFICATION (GENERATOR)

FIG.13 FIFTH MODIFICATION (PROPULSION DEVICE)

FIG.14  SIXTH MODIFICATION (PROPULSION DEVICE)

ROTATING ELECTRICAL MACHINE APPARATUS

CROSS-REFERENCE TO RELATED APPLICATION

The priority application number JP2014-259755, Rotating Electrical Machine Apparatus, Dec. 24, 2014, Takayoshi Suzuki, Ryoma Matsuo, Satoshi Ishikawa, and Noriyoshi Hiraoka, upon which this patent application is based is hereby incorporated by reference.

BACKGROUND OF THE INVENTION

Field of the Invention

The present invention relates to a rotating electrical machine apparatus.

Description of the Background Art

A rotating electrical machine apparatus employed as a marine propulsion device or the like is known in general. Such a rotating electrical machine apparatus is disclosed in Japanese Patent Laying-Open No. 2013-100013, for example.

The aforementioned Japanese Patent Laying-Open No. 2013-100013 discloses a marine propulsion device (rotating electrical machine apparatus) including a cylindrical duct and a rim rotatable in the radial inward direction of the cylindrical duct. The rim of the marine propulsion device includes a cylindrical portion and blades provided in the radial inward direction of the cylindrical portion from the inner surface of the cylindrical portion, and a rotor portion provided in the cylindrical portion. The cylindrical duct includes a stator portion that faces the rotor portion of the rim in a radial outward direction.

In the marine propulsion device (rotating electrical machine apparatus) according to the aforementioned Japanese Patent Laying-Open No. 2013-100013, the stator portion is arranged in the radial outward direction of the rotor portion, and hence the radial thickness of the duct in which the stator portion is arranged is increased. Furthermore, in order to make uniform an interval between a portion of the stator portion and a portion of the rotor portion that face each other, a curved surface of the inner periphery of the stator portion and a curved surface of the outer periphery of the rotor portion are required to be accurately provided. Thus, the rotor portion and the stator portion arranged adjacent to each other in a radial direction are not easily provided. In general, a rotating electrical machine apparatus that allows easy formation of a rotor portion and a stator portion while significantly reducing an increase in the radial thickness of a duct is desired.

SUMMARY OF THE INVENTION

The present invention has been proposed in order to solve the aforementioned problem, and an object of the present invention is to provide a rotating electrical machine apparatus that allows easy formation of a rotor portion and a stator portion while significantly reducing an increase in the radial thickness of a duct.

In some embodiments, a rotating electrical machine apparatus includes a cylindrical duct having a stator portion. The cylindrical duct is provided with a recessed portion recessed radially outward from an inner surface of the cylindrical duct. The rotating electrical machine apparatus may also include a rim arranged to be rotatable and disposed in a radial inward direction of the cylindrical duct. The rim includes a cylindrical portion, and a blade protruding in a radial inward direction of the cylindrical portion from an inner surface of the cylindrical portion. The blade is configured so that following rotation of the blade, a first load acts on the rim along a rotation axis of the rim. The rim also includes a rotor portion attached to the cylindrical portion and housed in the recessed portion. The rotor portion is provided to face the stator portion along the rotation axis of the rim. The rotor portion and the stator portion are aligned along the rotation axis of the rim and controlled to generate a force in a direction opposite to a direction of the first load.

In the rotating electrical machine apparatus according to this aspect, as hereinabove described, the stator portion faces the rotor portion along the rotation axis. Thus, an increase in the radial thickness of the duct in which the stator portion is arranged is significantly reduced or prevented. The stator portion and the rotor portion are aligned along the rotation axis, and hence a flat surface of the stator portion and a flat surface of the rotor portion that face each other along the rotation axis are accurately provided such that an interval between a portion of the stator portion and a portion of the rotor portion that face each other are uniform. Thus, unlike the case where the stator portion and the rotor portion are radially aligned, a curved surface of the inner periphery of the stator portion and a curved surface of the outer periphery of the rotor portion are not required to be accurately adjusted and provided, and hence the rotor portion and the stator portion are easily provided. The rotor portion and the stator portion are aligned along the rotation axis of the rim such that a force is generated in the direction opposite to the direction of the first load that acts along the rotation axis of the rim. Thus, the load that acts along the rotation axis of the rim is reduced or even reduced to zero, and hence rotational resistance such as friction arising from the first load that acts along the rotation axis is reduced or even reduced to zero. Consequently, the rim is efficiently rotated.

In the aforementioned rotating electrical machine apparatus according to this aspect, a second load preferably acts in a first direction along the rotation axis on the rim, and the rotor portion and the stator portion are preferably arranged and controlled such that a suction force formed between the rotor portion and the stator portion acts in a second direction opposite to the first direction along the rotation axis of the rim. According to this structure, the second load that acts in the first direction along the rotation axis is easily offset by the suction force between the rotor portion and the stator portion that acts in the second direction opposite to the first direction.

In this case, the rotating electrical machine apparatus includes an electric propulsion unit including the cylindrical duct and the rim. In the electric propulsion unit, an electric power supply from an external power supply is supplied to the stator portion such that the rim is rotated with respect to the cylindrical duct. The second load includes a reaction force of a propulsion force generated by the electric propulsion unit when the rim is rotated with respect to the cylindrical duct. According to this structure, rotational resistance arising from the reaction force of the propulsion force generated by the electric propulsion unit is reduced or even reduced to zero, and efficient operation of the electric propulsion unit is promoted.

In the aforementioned structure in which the rotor portion and the stator portion are arranged such that the suction force acts in the second direction, the rotating electrical machine apparatus includes a generator including the cylindrical duct and the rim. The generator generates electric power by rotating the blade according to a flow of an external fluid. The flow of the external fluid causes the second load to act in the first direction along the rotation axis on the rim.

According to this structure, rotational resistance arising from the load of the flow of the external fluid is reduced or even reduced to zero, and efficient operation of the generator is promoted.

In the aforementioned rotating electrical machine apparatus according to some embodiments, the blade preferably has a wing shape. According to this structure, in the case of the electric propulsion unit, a propulsion force is efficiently generated by the blade having the wing shape. In the case of the generator, electric power is efficiently generated from the flow of the external fluid by the blade having the wing shape.

The aforementioned rotating electrical machine apparatus according to this aspect is preferably mounted as a propulsion device on a boat body. According to this structure, the rotating electrical machine apparatus is employed as the propulsion device to move the boat body.

In this case, the aforementioned rotating electrical machine apparatus is preferably mounted on the boat body through a bracket. According to this structure, the rotating electrical machine apparatus is easily mounted on the boat body.

In the aforementioned structure mounted as the propulsion device on the boat body, the cylindrical duct is preferably rotatable about a turning axis that intersects with the rotation axis of the rim. According to this structure, the generation direction of the propulsion force of the rotating electrical machine apparatus with respect to the boat body is easily changed, and hence the boat body is easily maneuvered by rotating the rotating electrical machine apparatus.

In the aforementioned structure mounted as the propulsion device on the boat body, the sectional shape of the cylindrical duct is preferably changed along the rotation axis of the rim. According to this structure, a fluid that flows in the cylindrical duct is rectified, and a propulsion force is efficiently generated.

In the aforementioned rotating electrical machine apparatus according to this aspect, the blade preferably includes at least three and not more than eight blades. According to this structure, at least the three and not more than eight blades are arranged in the radial inward direction of the cylindrical portion of the rim in a balanced manner, and efficient operation of the rotating electrical machine apparatus is promoted.

In the aforementioned rotating electrical machine apparatus according to this aspect, the rotor portion and the stator portion preferably constitute a Switched Reluctance motor. According to this structure, the rotor portion and the stator portion are easily provided while an increase in the radial thickness of the duct of the rotating electrical machine apparatus including the Switched Reluctance motor is significantly reduced or prevented.

In this case, the stator portion preferably includes a first stator portion arranged in one direction along the rotation axis of the rim with respect to the rotor portion and a second stator portion arranged in another direction along the rotation axis of the rim with respect to the rotor portion. The one direction may be opposite to the another direction.

According to this structure, a suction force between the first stator portion and the rotor portion and a suction force between the second stator portion and the rotor portion act in directions opposite to each other, and hence a force that acts along the rotation axis of the rotor portion is easily offset.

In the aforementioned structure in which the stator portion includes the first stator portion and the second stator portion, the rotating electrical machine apparatus may further comprise a controller that adjusts an electric power supplied to the first stator portion and the second stator portion to be preferably adjustable according to the direction and a magnitude of a generated propulsion force. According to this structure, the suction force between the first stator portion and the rotor portion and the suction force between the second stator portion and the rotor portion are adjusted, and hence the force that acts along the rotation axis of the rotor portion according to the direction and magnitude of the generated propulsion force is easily offset.

In the aforementioned structure in which the stator portion includes the first stator portion and the second stator portion, the rotating electrical machine apparatus may further comprise a controller that adjusts an electric power to generate a first suction force between the first stator portion and the rotor portion, and a second suction force between the second stator portion and the rotor portion. A magnitude of the first suction force is different from a magnitude of the second suction force.

According to this structure, the resultant force of the first suction force and the second suction force is not reduced to zero, and hence a force that offsets a force arising from the propulsion force of the rotor portion is easily generated.

In this case, a combined resultant force of the first suction force and the second suction force preferably acts in a direction opposite to the reaction force of a generated propulsion force. According to this structure, the force that acts along the rotation axis of the rotor portion is easily reduced or even reduced to zero.

In the aforementioned structure in which the stator portion includes the first stator portion and the second stator portion, the rotating electrical machine apparatus may further comprise a controller that is preferably configured to determine the generation direction of a propulsion force depending on an accelerating operation or a shifting operation and adjust an electric power supplied to the first stator portion and the second stator portion. According to this structure, depending on the accelerating operation or the shifting operation, the output and electric power supplied to the first stator portion and the second stator portion are adjusted such that the force that acts along the rotation axis of the rotor portion is easily offset.

In the aforementioned rotating electrical machine apparatus according to this aspect, the rotor portion preferably includes a permanent magnet, and the rotating electrical machine apparatus further comprises a suction member preferably provided opposite the recessed portion and separately from the stator portion so as to face the rotor portion of the rim along the rotation axis. A suction force is preferably generated between the permanent magnet of the rotor portion and the suction member. According to this structure, a suction force between the rotor portion including the permanent magnet and the stator portion constantly generated is generated in a direction opposite to the suction force between the rotor portion and the suction member and is easily offset by the suction force between the rotor portion and the suction member.

In some embodiments, the stator portion is provided opposite the recessed portion.

The foregoing and other objects, features, aspects, and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment

The structure of a rotating electrical machine apparatus 100 according to a first embodiment of the present invention is now described with reference to FIGS. 1 to 4. In the figure, arrow FWD represents the forward movement direction of a boat, and arrow BWD represents the reverse movement direction of the boat. Furthermore, in the figure, arrow R represents the starboard direction of the boat, and arrow L represents the portside direction of the boat.

Figure 1:
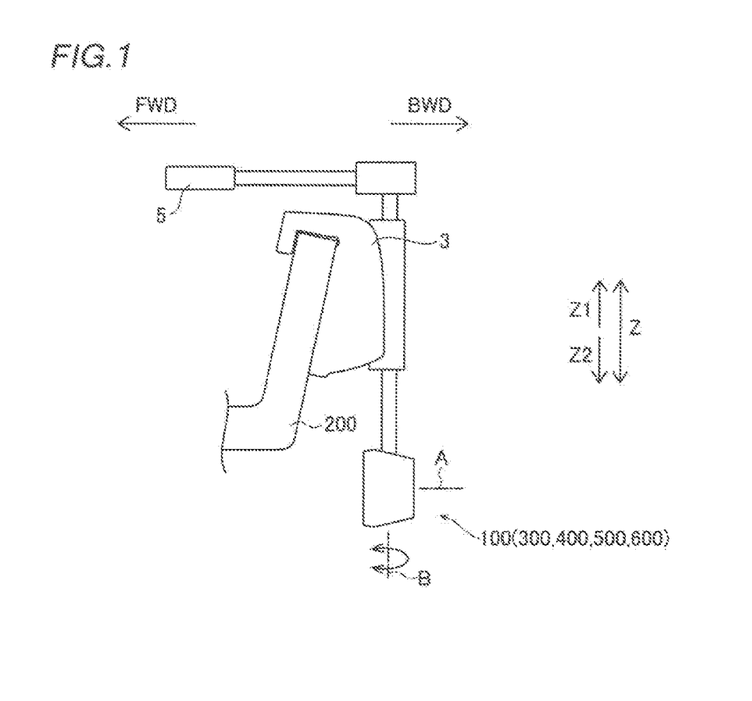
FIG. 1 is a diagram showing a boat including a rotating electrical machine apparatus according to a first embodiment of the present invention.
Figure 3:
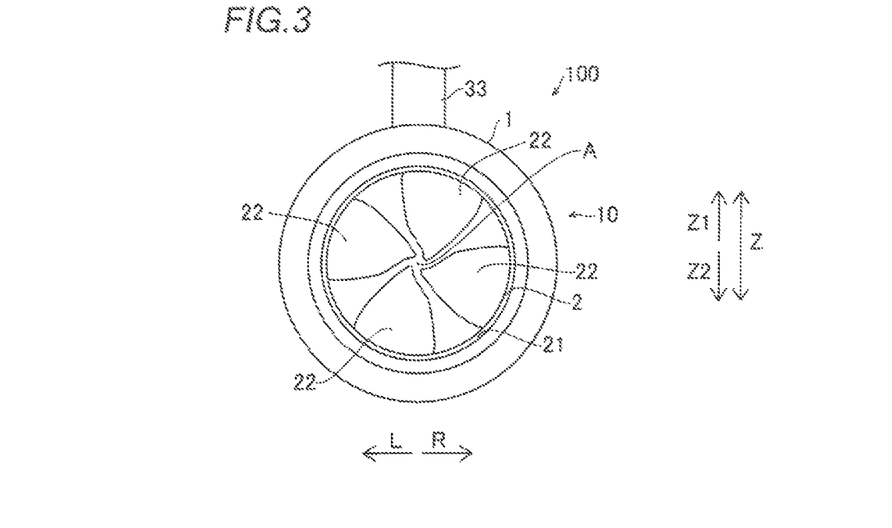
FIG. 3 is a rear elevational view of the rotating electrical machine apparatus according to the first embodiment of the present invention.
Figure 4:
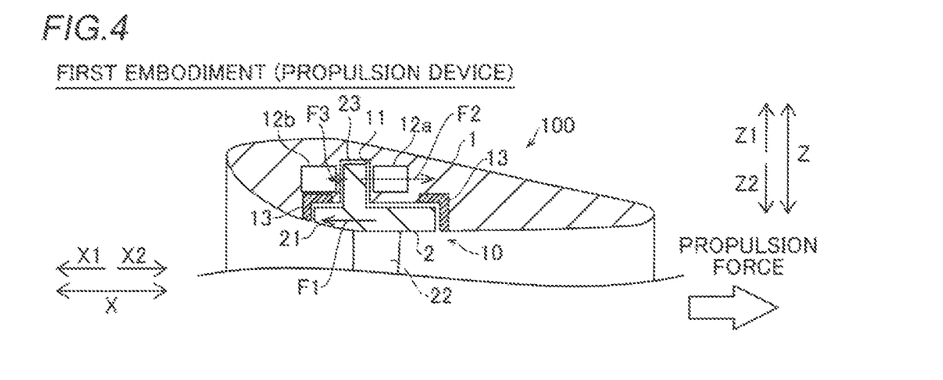
FIG. 4 is a side sectional view of the rotating electrical machine apparatus according to the first embodiment of the present invention.

The rotating electrical machine apparatus 100 includes an electric propulsion unit (propulsion device) that propels a boat body 200 shown in FIG. 1. The rotating electrical machine apparatus 100 includes a cylindrical duct 1 and a rim 2, as shown in FIGS. 3 and 4. The duct 1 includes a recessed portion 11, stator portions 12a and 12b, and a liquid bearing 13. The rim 2 includes a cylindrical portion 21, blades 22, and a rotor portion 23. A motor 10 (Switched Reluctance motor) is constituted by the stator portions 12a and 12b and the rotor portion 23. The stator portions 12a and 12b are examples of the "first stator portion" and the "second stator portion" in the present invention, respectively.

Figure 2:
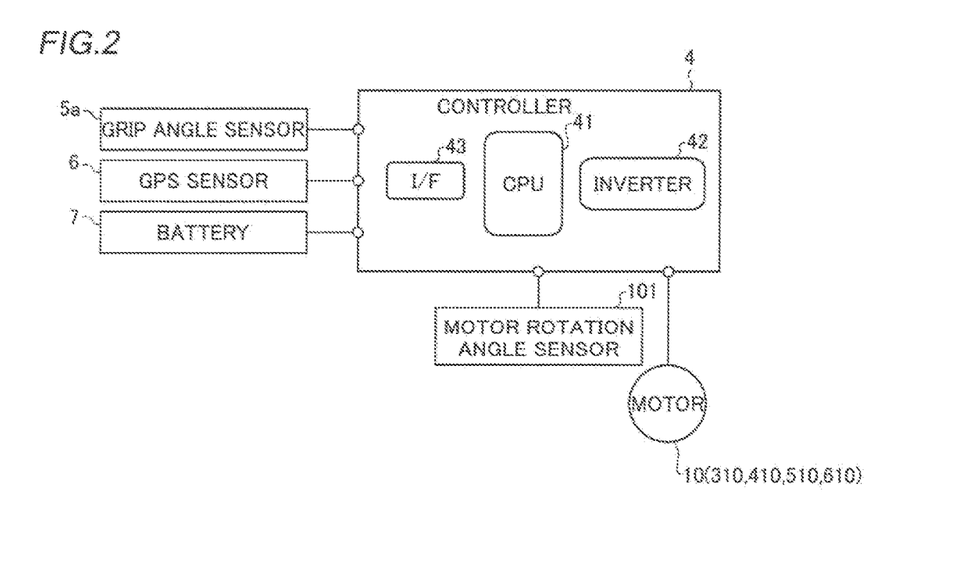
FIG. 2 is a block diagram showing control connection of the rotating electrical machine apparatus according to the first embodiment of the present invention.

The rotating electrical machine apparatus 100 is mounted on the boat body 200 through a bracket 3, as shown in FIG. 1. The rotating electrical machine apparatus 100 (motor 10) is connected to a controller 4, as shown in FIG. 2. A grip angle sensor 5a, a GPS (global positioning system) sensor 6, a battery 7, and a motor rotation angle sensor 101 are further connected to the controller 4. The controller 4 includes a CPU (central processing unit) 41, an I/F (interface) 43, and an inverter 42. The battery 7 is an example of the "external power supply" in the present invention.

The forward/backward direction and magnitude of the propulsion force of the rotating electrical machine apparatus 100 are adjusted by operation of an accelerator grip 5, as shown in FIG. 1. The rotating electrical machine apparatus 100 (duct 1) rotates about a turning axis B that intersects with the rotation axis A of the rim 2. In other words, an accelerator grip 5 is operated in a right-left direction, whereby the orientation of the rotating electrical machine apparatus 100 is changed, and the boat body 200 is steered.

As shown in FIGS. 3 and 4, the duct 1 is cylindrical. The sectional shape of the duct 1 is changed along the rotation axis of the rim 2. In other words, a portion of the duct 1 in a direction X1 widens outwardly, and a portion of the duct 1 in a direction X2 gradually narrows. The recessed portion 11 of the duct 1 is recessed radially outwardly from the inner surface of the duct 1 and is circumferentially provided. The rotor portion 23 is housed in the recessed portion 11.

The stator portions 12a and 12b are provided in the recessed portion 11 so as to face the rotor portion 23 of the rim 2 along the rotation axis A (direction X). Specifically, the stator portion 12a is arranged in the recessed portion 11 in the direction X2, and the stator portion 12b is arranged in the recessed portion 11 in the direction X1. Also, the stator portions 12a, 12b may be provided outside the recessed portion 11 so long as they are able to function as described below. The stator portions 12a and 12b are arranged in one direction and the other direction, respectively, along the rotation axis A through the rotor portion 23. The stator portions 12a and 12b include winding wires. In the stator portions 12a and 12b, electric power is supplied to the winding wires such that magnetic fields are generated. A plurality of winding wires are arranged circumferentially along the cylindrical duct 1. Electric power is supplied to the plurality of winding wires in synchronization with the rotational speed of the rotating electrical machine apparatus 100 (motor 10). Thus, the magnetic forces of the stator portions 12a and 12b act on the rotor portion 23 of the rim 2, and hence the rim 2 is rotated.

In other words, according to the first embodiment, the rotor portion 23 and the stator portions 12a and 12b are aligned along the rotation axis A of the rim 2 such that a force is generated in a direction opposite to the direction of a load that acts along the rotation axis A of the rim 2 of loads that act on the rim 2 following rotation of the blades 22. Electric power supplied to the stator portions 12a and 12b is adjustable according to the direction and magnitude of a generated propulsion force. Thus, suction forces between both the stator portions 12a and 12b and the rotor portion 23 along the rotation axis A are adjusted to be offset by the load.

Thus, the stator portions 12a and 12b act on the rotor portion 23 to rotate the rim 2 and thereby rotate the blades 22. Moreover, the stator portions 12a and 12b are aligned with the rotor portion 23 along the rotation axis A to generate a force in a direction opposite to the direction of a load generated by rotation of the blades 22. Accordingly, the stator portions 12a and 12b and the rotor portion 23 serve several functions. Furthermore, the rotor 23 may extend along a circumferential direction of the rim 2.

The liquid bearing 13 rotatably supports the rim 2. The liquid bearing 13 is arranged circumferentially along the cylindrical duct 1.

The rim 2 is arranged to be rotatable in the radial inward direction of the cylindrical duct 1. The cylindrical portion 21 of the rim 2 is cylindrically provided outwardly of the blades 22. The blades 22 are provided in the radial inward direction of the cylindrical portion 21 from the inner surface of the cylindrical portion 21. Four blades 22 are provided at equal intervals (every 90 degrees) along a circumferential direction, as shown in FIG. 3. The blades 22 each have a wing shape.

The rotor portion 23 is provided outwardly of the cylindrical portion 21. The rotor portion 23 is housed in the recessed portion 11 of the duct 1. In the rotor portion 23, portions having a large magnetic permeability and portions having a small magnetic permeability are alternately arranged circumferentially. In other words, in the rotor portion 23, a reluctance torque is generated by a magnetic force generated from the stator portions 12a and 12b. Thus, the rotor portion 23 (rim 2) rotates.

The bracket 3 supports the rotating electrical machine apparatus 100 such that the rotating electrical machine apparatus 100 is rotatable about the turning axis B and about a tilt axis in a horizontal direction, as shown in FIG. 1. The rotating electrical machine apparatus 100 is mounted on a rear portion of the boat body 200 through the bracket 3.

The controller 4 is configured to control driving of the motor 10, as shown in FIG. 2. Specifically, the controller 4 controls the rotational speed of the motor 10 on the basis of operation of the accelerator grip 5 detected by the grip angle sensor 5a. The controller 4 detects the speed of the boat body 200 on the basis of the position of the boat body 200 detected by the GPS sensor 6. The controller 4 acquires the rotational speed of the motor 10 from the motor rotation angle sensor 101. The controller 4 calculates an advance ratio from the speed of the boat body 200 and the rotational speed of the motor 10 and acquires a thrust factor from the calculated advance ratio. The thrust factor may be obtained by calculation or from a propeller characteristics map. The controller 4 calculates a thrust force (propulsion force) from the thrust factor and the rotational speed of the motor 10.

The CPU 41 receives signals from the various sensors through the I/F 43. The CPU 41 supplies electric power to the motor 10 (stator portions 12a and 12b) through the inverter 42.

According to the first embodiment, when a propulsion force (water flow) is generated in the direction X2 by rotation of the blades 22, as shown in FIG. 4, a load acts in a first direction (direction X1) along the rotation axis A on the rim 2, and a resultant force of the suction forces between the rotor portion 23 and both the stator portions 12a and 12b acts in a second direction (direction X2) opposite to the first direction along the rotation axis A of the rim 2. In other words, a force F1, which may also be referred to as a rotation load, acts in the direction X1 as the reaction force of the propulsion force on the rim 2. Furthermore, a suction force F2 to the stator portion 12a acts in the direction X2 on the rim 2 (rotor portion 23), and a suction force F3 to the stator portion 12b acts in the direction X1 on the rim 2 (rotor portion 23). In this case, the suction force F2 is adjusted to be larger than the suction force F3, and the total suction force acts in the direction X2.

In other words, a resultant force of the suction force F2 and the suction force F3 acts in the direction X2 opposite to the reaction force (force F1) of the generated propulsion force. The suction force F2 between the stator portion 12a and the rotor portion 23 and the suction force F3 between the stator portion 12b and the rotor portion 23 are different from each other in magnitude. In other words, the controller 4 adjusts electric power supplied to the stator portions 12a and 12b according to the direction and magnitude of the generated propulsion force. When the propulsion force (thrust force) is large and the force F1 (reaction force) is large, for example, the controller 4 increases electric power supplied to the stator portion 12a and reduces electric power supplied to the stator portion 12b. When the propulsion force (thrust force) is small and the force F1 is small, on the other hand, the controller 4 reduces electric power supplied to the stator portion 12a and increases electric power supplied to the stator portion 12b.

Suction force control processing performed by the controller 4 in the rotating electrical machine apparatus 100 is now described with reference to FIG. 5. This suction force control processing is continuously performed during operation of the rotating electrical machine apparatus 100.

Figure 5:
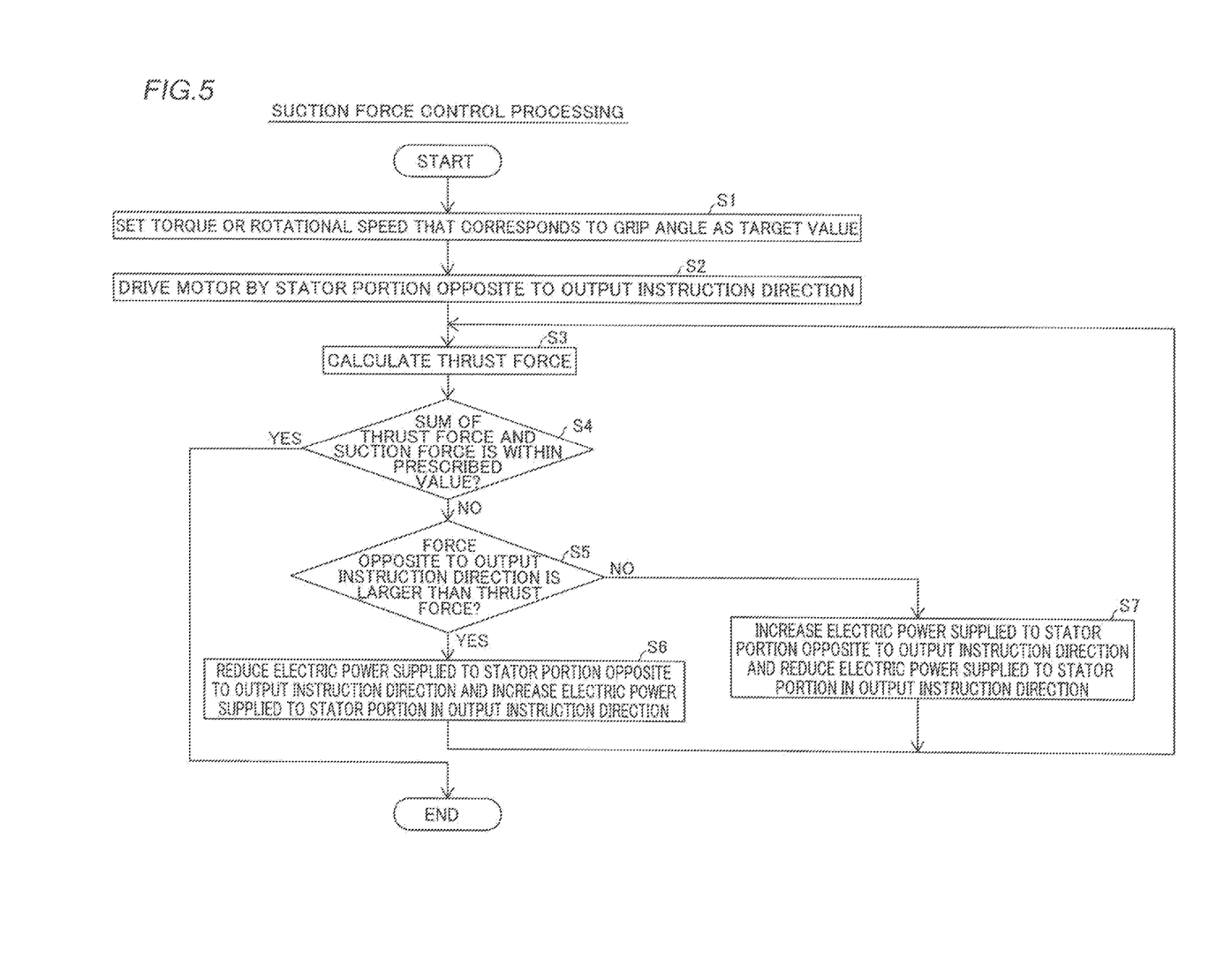
FIG. 5 is a flowchart for illustrating suction force control processing in the rotating electrical machine apparatus according to the first embodiment of the present invention.

At a step S1 in FIG. 5, the controller 4 sets a torque or a rotational speed that corresponds to a grip angle detected by the grip angle sensor 5a as a target value. In other words, the controller 4 sets a target value for the output of the propulsion force of the rotating electrical machine apparatus 100 on the basis of user's operation of the accelerator grip 5. At a step S2, the controller 4 drives the motor 10 by the stator portion 12a or 12b opposite to an output instruction direction. In the case of an output instruction of the forward movement direction (in the case where the boat body 200 is moved in the direction X1), for example, the controller 4 supplies electric power to the stator portion 12a in the direction X2 and drives the motor 10. In the case of an output instruction of the reverse movement direction (in the case where the boat body 200 is moved in the direction X2), on the other hand, the controller 4 supplies electric power to the stator portion 12b in the direction X1 and drives the motor 10.

At a step S3, the controller 4 calculates a thrust force. Specifically, the controller 4 calculates a thrust force (propulsion force) from the speed of the boat body 200 and the rotational speed of the rotating electrical machine apparatus 100 (motor 10). At a step S4, the controller 4 determines whether or not the sum of the thrust force and a suction force is within a prescribed value. Specifically, the controller 4 determines whether or not the sum of the thrust force (=the force F1 that is a reaction force) and the resultant force of the suction forces F2 and F3 (a resultant force of the force F1 and the suction forces F2 and F3) is within a prescribed value. When determining that the sum of the thrust force and the suction forces is within the prescribed value, the controller 4 terminates the suction force control processing. When determining that the sum of the thrust force and the suction forces is not within the prescribed value, on the other hand, the controller 4 advances to a step S5.

At the step S5, the controller 4 determines whether or not a force (suction force) opposite to the output instruction direction is larger than the thrust force. In the case of the output instruction of the forward movement direction, for example, the controller 4 determines whether or not the magnitude of the suction force F2 between the stator portion 12a in the direction X2 and the rotor portion 23 is larger than the magnitude of the thrust force (=the force F1 that is a reaction force). When determining that the force (suction force) opposite to the output instruction direction is larger than the thrust force, the controller 4 advances to a step S6. When determining that the force (suction force) opposite to the output instruction direction is not larger than the thrust force, on the other hand, the controller 4 advances to a step S7.

At the step S6, the controller 4 reduces electric power supplied to the stator portion 12a or 12b opposite to the output instruction direction and increases electric power supplied to the stator portion 12a or 12b in the output instruction direction. In the case of the output instruction of the forward movement direction (in the case where a thrust force is generated in the direction X2), for example, the controller 4 reduces electric power supplied to the stator portion 12a in the direction X2 and increases electric power supplied to the stator portion 12b in the direction X1. Then, the controller 4 returns to the step S3.

At the step S7, the controller 4 increases electric power supplied to the stator portion 12a or 12b opposite to the output instruction direction and reduces electric power supplied to the stator portion 12a or 12b in the output instruction direction. In the case of the output instruction of the forward movement direction (in the case where a thrust force is generated in the direction X2), for example, the controller 4 increases electric power supplied to the stator portion 12a in the direction X2 and reduces electric power supplied to the stator portion 12b in the direction X1. Then, the controller 4 returns to the step S3.

The controller 4 adjusts electric power supplied to the stator portions 12a and 12b such that the torque or rotational speed of the rotating electrical machine apparatus 100 (motor 10) is the target value, and supplies the adjusted electric power to the stator portions 12a and 12b. In the case where the target value is constant, for example, driving of the motor 10 becomes highly efficient due to a reduction in friction loss caused by a load along the rotation axis A, and hence the sum of electric power supplied to the stator portion 12a and electric power supplied to the stator portion 12b is reduced.

According to the aforementioned first embodiment, the following effects are obtained.

According to the first embodiment, as hereinabove described, the stator portions 12a and 12b face the rotor portion 23 along the rotation axis A. Thus, an increase in the radial thickness of the duct 1 in which the stator portions 12a and 12b are arranged is significantly reduced or prevented. The stator portions 12a and 12b and the rotor portion 23 are aligned along the rotation axis A, and hence flat surfaces of the stator portions 12a and 12b and a flat surface of the rotor portion 23 that face each other along the rotation axis A are accurately provided such that intervals between portions of the stator portions 12a and 12b and a portion of the rotor portion 23 that face each other are uniform. Thus, unlike the case where the stator portions 12a and 12b and the rotor portion 23 are radially aligned, curved surfaces of the inner peripheries of the stator portions 12a and 12b and a curved surface of the outer periphery of the rotor portion 23 are not required to be accurately adjusted and provided, and hence the rotor portion 23 and the stator portions 12a and 12b are easily provided. The rotor portion 23 and the stator portions 12a and 12b are aligned along the rotation axis A of the rim 2 such that a force is generated in the direction opposite to the direction of the load that acts along the rotation axis A of the rim 2 of the loads that act on the rim 2 following the rotation of the blades 22. Thus, the load that acts along the rotation axis A of the rim 2 is reduced or even reduced to zero, and hence rotational resistance such as friction arising from the load that acts along the rotation axis A is reduced or even reduced to zero. Consequently, the rim 2 is efficiently rotated since the friction is reduced.

According to the first embodiment, as hereinabove described, a load acts in the first direction (direction X1) along the rotation axis A on the rim 2, and the rotor portion 23 and the stator portions 12a and 12b are arranged such that the resultant force of the suction forces therebetween acts in the second direction (direction X2) opposite to the first direction along the rotation axis A of the rim 2. Thus, the load that acts in the first direction (direction X1) along the rotation axis A is easily offset by the resultant force of the suction forces between the rotor portion 23 and both the stator portions 12a and 12b that acts in the second direction (direction X2) opposite to the first direction.

According to the first embodiment, as hereinabove described, the rotating electrical machine apparatus 100 includes the electric propulsion unit (propulsion device) in which the rim 2 is rotated with respect to the cylindrical duct 1 by electric power supply from the battery 7 to the stator portions 12a and 12b, and the load that acts in the first direction (direction X1) along the rotation axis A of the rim 2 includes the reaction force of the propulsion force generated by the electric propulsion unit. Thus, rotational resistance arising from the reaction force of the propulsion force generated by the electric propulsion unit is reduced or even reduced to zero, and efficient operation of the electric propulsion unit is promoted.

According to the first embodiment, as hereinabove described, the blades 22 each have the wing shape. Thus, a propulsion force is efficiently generated by the blades 22 each having the wing shape.

According to the first embodiment, as hereinabove described, the rotating electrical machine apparatus 100 is mounted as the propulsion device on the boat body 200. Thus, the rotating electrical machine apparatus 100 is employed as the propulsion device to move the boat body 200.

According to the first embodiment, as hereinabove described, the rotating electrical machine apparatus 100 is mounted on the boat body 200 through the bracket 3. Thus, the rotating electrical machine apparatus 100 is easily mounted on the boat body 200.

According to the first embodiment, as hereinabove described, the cylindrical duct 1 is rotatable about the turning axis B that intersects with the rotation axis A of the rim 2. Thus, the generation direction of the propulsion force of the rotating electrical machine apparatus 100 with respect to the boat body 200 is easily changed, and hence the boat body 200 is easily maneuvered by rotating the rotating electrical machine apparatus 100.

According to the first embodiment, as hereinabove described, the sectional shape of the cylindrical duct 1 is changed along the rotation axis A of the rim 2. Thus, a fluid that flows in the cylindrical duct 1 is rectified, and the propulsion force is efficiently generated.

According to the first embodiment, as hereinabove described, the four blades 22 are provided. Thus, the four blades 22 are arranged in the radial inward direction of the cylindrical portion 21 of the rim 2 in a balanced manner, and efficient operation of the rotating electrical machine apparatus 100 is promoted. However, more or less blades 22 may be utilized.

According to the first embodiment, as hereinabove described, the Switched Reluctance motor is constituted by the rotor portion 23 and the stator portions 12a and 12b. Thus, the rotor portion 23 and the stator portions 12a and 12b are easily provided while an increase in the radial thickness of the duct 1 of the rotating electrical machine apparatus 100 including the Switched Reluctance motor is significantly reduced or prevented.

According to the first embodiment, as hereinabove described, electric power supplied to the stator portions 12a and 12b is adjustable according to the direction and magnitude of the generated propulsion force. Thus, the suction force between the stator portion 12a and the rotor portion 23 and the suction force between the stator portion 12b and the rotor portion 23 are adjusted, and hence the forces between the rotor portion 23 and both the stator portions 12a and 12b that act along the rotation axis A according to the direction and magnitude of the generated propulsion force are easily offset.

According to the first embodiment, as hereinabove described, the suction force F2 between the stator portion 12a and the rotor portion 23 and the suction force F3 between the stator portion 12b and the rotor portion 23 are different from each other in magnitude. Thus, the resultant force of the suction force F2 and the suction force F3 is not reduced to zero, and hence the force that offsets the force arising from the propulsion force of the rotor portion 23 is easily generated.

According to the first embodiment, as hereinabove described, the resultant force of the suction force F2 and the suction force F3 acts in the direction opposite to the reaction force of the generated propulsion force. Thus, the force that acts along the rotation axis A of the rotor portion 23 is easily reduced or even reduced to zero.

According to the first embodiment, as hereinabove described, the generation direction of the propulsion force is determined depending on an accelerating operation or a shifting operation, and electric power supplied to the stator portion 12a and the stator portion 12b is adjusted. Thus, depending on the accelerating operation or the shifting operation, the output and electric power supplied to the stator portions 12a and 12b are adjusted such that the force that acts along the rotation axis A of the rotor portion 23 is easily offset.

Modification of First Embodiment (First Modification)

A modification (first modification) of the first embodiment of the present invention is now described with reference to FIG. 6. In this first modification, a rotating electrical machine apparatus is employed as a generator.

Figure 6:
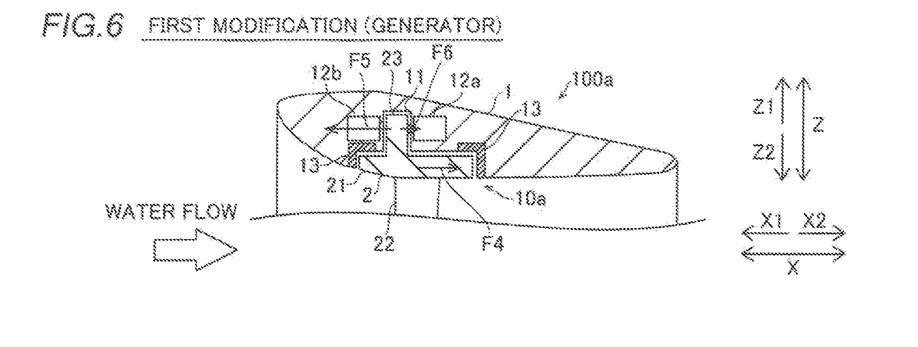
FIG. 6 is a side sectional view of a rotating electrical machine apparatus according to a modification (first modification) of the first embodiment of the present invention.

As shown in FIG. 6, a rotating electrical machine apparatus 100a according to the first modification includes a generator that generates electric power by rotating blades 22 according to flow of an external fluid. In other words, in the rotating electrical machine apparatus 100a, a rotor portion 23 is rotated by rotation of the blades 22, and a magnetic field is changed. A switching element of a converter is switched such that electric currents flow in coils of stator portions 12a and 12b by the change of the magnetic field, and electric power is generated.

When water flows from a direction X1 toward a direction X2, the force of the water flow is converted into the rotation force of a rim 2, and a force F4 acts in the direction X2. Electric currents flow in the coils of the stator portions 12a and 12b, whereby a suction force F5 is generated between the stator portion 12b and the rotor portion 23, and a suction force F6 is generated between the stator portion 12a and the rotor portion 23. The suction forces F5 and F6 are adjusted to offset the force F4 of the water flow. Utilizing that a suction force (magnetic force) is increased as the power generation amount is increased, for example, the power generation amount assigned to the stator portions 12a and 12b is adjusted. Thus, the magnitude of the suction force F5 that acts in the direction X1 and the magnitude of the suction force F6 that acts in the direction X2 are adjusted.

The remaining structure of the rotating electrical machine apparatus 100a according to the first modification is similar to that of the rotating electrical machine apparatus 100 according to the aforementioned first embodiment.

According to the modification (first modification) of the aforementioned first embodiment, the following effects are obtained.

According to the modification (first modification) of the first embodiment, as hereinabove described, the rotating electrical machine apparatus 100a includes the generator that generates electric power by rotating the blades 22 according to the flow of the external fluid, and a load acts in a first direction (direction X2) along a rotation axis A on the rim 2 by the flow of the external fluid. Thus, rotational resistance arising from the load of the flow of the external fluid is reduced or even reduced to zero, and efficient operation of the generator is promoted.

Second Embodiment

A second embodiment of the present invention is now described with reference to FIG. 7. In this second embodiment, a stator portion is arranged in either one direction or the other direction along a rotation axis of a rim, unlike the aforementioned first embodiment in which the stator portions are arranged in both one direction and the other direction along the rotation axis of the rim. Portions similar to those of the rotating electrical machine apparatus 100 according to the first embodiment are denoted by the same reference numerals.

Figure 7:
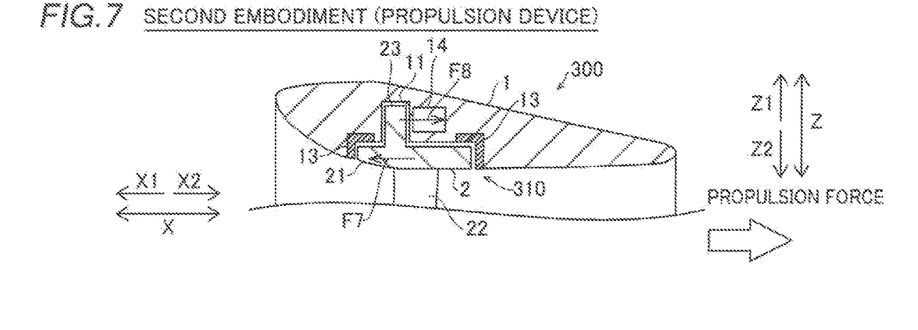
FIG. 7 is a side sectional view of a rotating electrical machine apparatus according to a second embodiment of the present invention.

According to the second embodiment, a rotating electrical machine apparatus 300 includes a motor 310 and is employed as a propulsion device, as shown in FIG. 7. A load acts in a first direction (direction X1) along a rotation axis A on a rim 2 by rotational driving of the rotating electrical machine apparatus 300. A stator portion 14 is arranged such that a suction force acts in a second direction (direction X2) opposite to the first direction along the rotation axis A of the rim 2. In other words, the stator portion 14 is arranged in the direction X2 relative to a rotor portion 23.

According to the second embodiment, a force F7 acts in the direction X1 as the reaction force of a propulsion force on the rim 2. Furthermore, a suction force F8 to the stator portion 14 acts in the direction X2 on the rim 2 (rotor portion 23).

The remaining structure of the rotating electrical machine apparatus 300 according to the second embodiment is similar to that of the rotating electrical machine apparatus 100 according to the aforementioned first embodiment.

According to the second embodiment, the following effects are obtained.

According to the second embodiment, the stator portion 14 faces the rotor portion 23 along the rotation axis A, whereby the rotor portion 23 and the stator portion 14 are easily provided while an increase in the radial thickness of a duct 1 is significantly reduced or prevented, similarly to the aforementioned first embodiment. The rotor portion 23 and the stator portion 14 are aligned along the rotation axis A of the rim 2 such that a force is generated in a direction opposite to the direction of a load that acts along the rotation axis A of the rim 2 of loads that act on the rim 2 following rotation of blades 22, whereby the rim 2 is efficiently rotated.

The remaining effects of the second embodiment are similar to those of the aforementioned first embodiment.

Modification of Second Embodiment (Second Modification)

A modification (second modification) of the second embodiment of the present invention is now described with reference to FIG. 8. In this second modification, a rotating electrical machine apparatus is employed as a generator.

Figure 8:
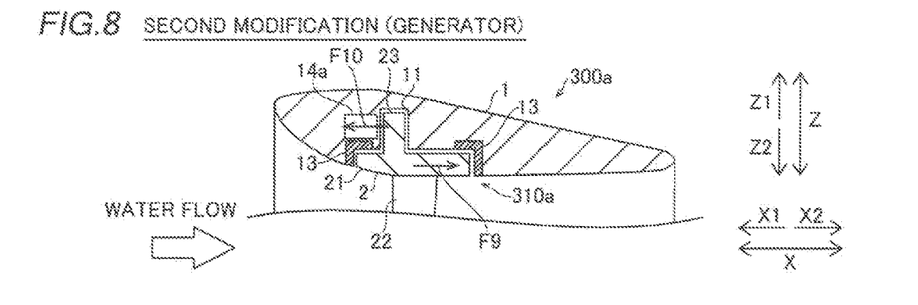
FIG. 8 is a side sectional view of a rotating electrical machine apparatus according to a modification (second modification) of the second embodiment of the present invention.

As shown in FIG. 8, a rotating electrical machine apparatus 300a according to the second modification includes a generator that generates electric power by rotating blades 22 according to flow of an external fluid. In other words, in the rotating electrical machine apparatus 300a, a rotor portion 23 is rotated by rotation of the blades 22, and a magnetic field is changed. A stator portion 14a is arranged in a direction X1 relative to the rotor portion 23. A switching element of a converter is switched such that an electric current flows in a coil of the stator portion 14a by the change of the magnetic field, and electric power is generated.

When water flows from the direction X1 toward a direction X2, the force of the water flow is converted into the rotation force of a rim 2, and a force F9 acts in the direction X2. An electric current flows in the coil of the stator portion 14a, whereby a suction force F10 is generated between the stator portion 14a and the rotor portion 23.

The remaining structure of the rotating electrical machine apparatus 300a according to the second modification is similar to that of the rotating electrical machine apparatus 300 according to the aforementioned second embodiment.

Third Embodiment

A third embodiment of the present invention is now described with reference to FIG. 9. In this third embodiment, permanent magnets are provided in a rotor portion, unlike the aforementioned first and second embodiments in which no permanent magnet is provided in the rotor portions. Portions similar to those of the rotating electrical machine apparatus 100 according to the first embodiment are denoted by the same reference numerals.

Figure 9:
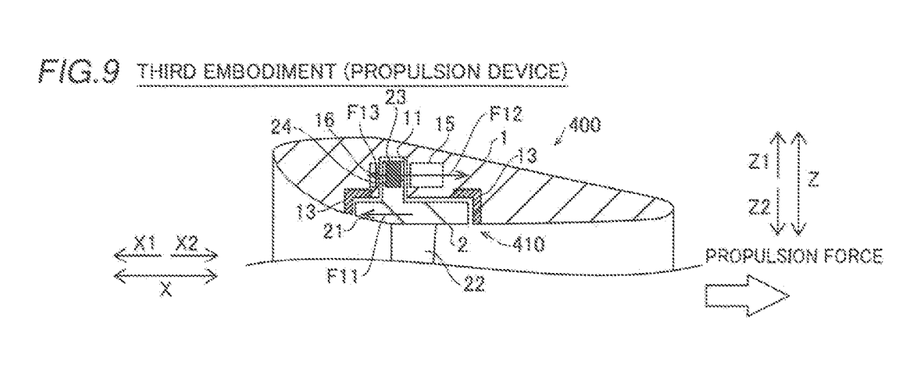
FIG. 9 is a side sectional view of a rotating electrical machine apparatus according to a third embodiment of the present invention.

According to the third embodiment, a rotating electrical machine apparatus 400 includes a motor 410 and is employed as a propulsion device, as shown in FIG. 9. A load acts in a first direction (direction X1) along a rotation axis A on a rim 2 by rotational driving of the rotating electrical machine apparatus 400. A stator portion 15 is arranged such that a suction force acts in a second direction (direction X2) opposite to the first direction along the rotation axis A of the rim 2. In other words, the stator portion 15 is arranged in the direction X2 relative to a rotor portion 23.

The rotor portion 23 is provided with a plurality of permanent magnets 24. Specifically, the plurality of permanent magnets 24 are arranged circumferentially along the rim 2 such that the north poles or the south poles thereof face the stator portion 15 along the rotation axis A (direction X2). The permanent magnets 24 may be ferrite magnets or neodymium magnet, for example.

In a recessed portion 11, a suction member 16 is provided separately from the stator portion 15 so as to face the rotor portion 23 of the rim 2 along the rotation axis A, and a suction force is generated between the suction member 16 and the permanent magnets 24 of the rotor portion 23. In some embodiments, the suction member 16 may be provided outside the recessed portion 11 as long as the suction member 16 operates to generate the suction force between the suction member 16 and the permanent magnets 24 of the rotor portion 23. Further, the suction member 16 is made of an iron material. The suction member 16 is arranged opposite (direction X1) to the stator portion 15 with respect to the rotor portion 23.

According to the third embodiment, a force F11 acts in the direction X1 as the reaction force of a propulsion force on the rim 2. Furthermore, a suction force F12 to the stator portion 15 acts in the direction X2 on the rim 2 (rotor portion 23), and a suction force F13 to the suction member 16 acts in the direction X1 on the rim 2 (rotor portion 23). In this case, the suction force F12 is adjusted to be larger than the suction force F13, and the total suction force acts in the direction X2.

The remaining structure of the rotating electrical machine apparatus 400 according to the third embodiment is similar to that of the rotating electrical machine apparatus 100 according to the aforementioned first embodiment.

According to the third embodiment, the following effects are obtained.

According to the third embodiment, the stator portion 15 faces the rotor portion 23 along the rotation axis A, whereby the rotor portion 23 and the stator portion 15 are easily provided while an increase in the radial thickness of a duct 1 is significantly reduced or prevented, similarly to the aforementioned first embodiment. The rotor portion 23 and the stator portion 15 are aligned along the rotation axis A of the rim 2 such that a force is generated in a direction opposite to the direction of a load that acts along the rotation axis A of the rim 2 of loads that act on the rim 2 following rotation of blades 22, whereby the rim 2 is efficiently rotated.

According to the third embodiment, as hereinabove described, the suction member 16 is provided separately from the stator portion 15 in the recessed portion 11 or outside the recessed portion 11 so as to face the rotor portion 23 of the rim 2 along the rotation axis A, and a suction force is generated between the suction member 16 and the permanent magnets 24 of the rotor portion 23. Thus, the suction force between the rotor portion 23 including the permanent magnets 24 and the stator portion 15 constantly generated is generated in a direction opposite to the suction force between the rotor portion 23 and the suction member 16 and is easily offset by the suction force between the rotor portion 23 and the suction member 16.

The remaining effects of the third embodiment are similar to those of the aforementioned first embodiment.

Modification of Third Embodiment (Third Modification)

A modification (third modification) of the third embodiment of the present invention is now described with reference to FIG. 10. In this third modification, a rotating electrical machine apparatus is employed as a generator.

Figure 10:
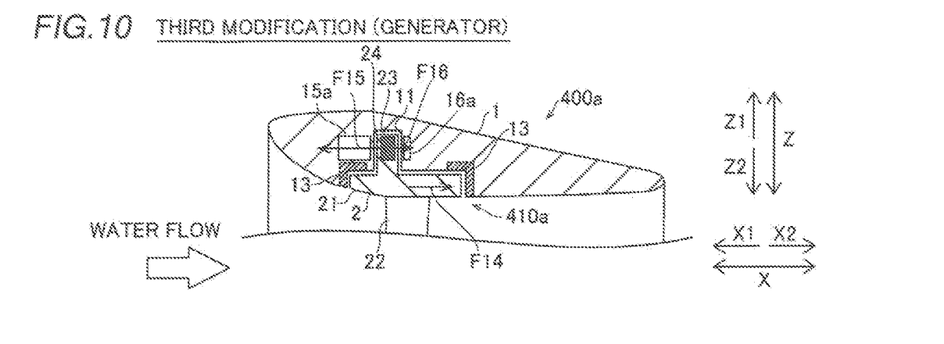
FIG. 10 is a side sectional view of a rotating electrical machine apparatus according to a modification (third modification) of the third embodiment of the present invention.

As shown in FIG. 10, a rotating electrical machine apparatus 400a according to the third modification includes a generator that generates electric power by rotating blades 22 according to flow of an external fluid. In other words, in the rotating electrical machine apparatus 400a, a rotor portion 23 is rotated by rotation of the blades 22, and a magnetic field is changed. An electric current flows in a coil of a stator portion 15a by the change of the magnetic field, and electric power is generated.

When water flows from a direction X1 toward a direction X2, the force of the water flow is converted into the rotation force of a rim 2, and a force F14 acts in the direction X2. A suction force F15 is generated between the stator portion 15a and the rotor portion 23 (permanent magnets 24), and a suction force F16 is generated between a suction member 16a and the rotor portion 23 (permanent magnets 24).

The remaining structure of the rotating electrical machine apparatus 400a according to the third modification is similar to that of the rotating electrical machine apparatus 400 according to the aforementioned third embodiment.

Fourth Embodiment

A fourth embodiment of the present invention is now described with reference to FIG. 11. In this fourth embodiment, no suction member is provided, unlike the aforementioned third embodiment in which the suction member is separately provided opposite to the stator portion. Portions similar to those of the rotating electrical machine apparatus 100 according to the first embodiment are denoted by the same reference numerals.

Figure 11:
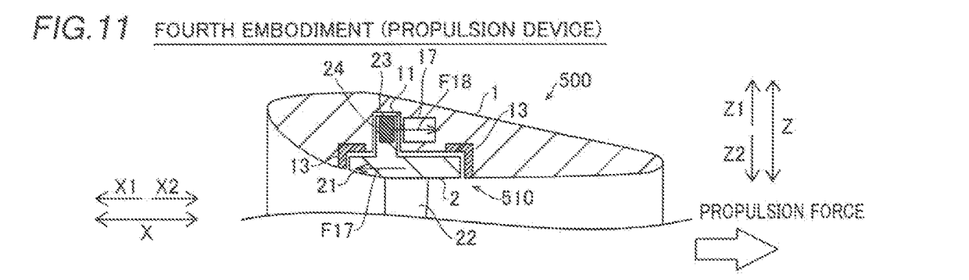
FIG. 11 is a side sectional view of a rotating electrical machine apparatus according to a fourth embodiment of the present invention.

According to the fourth embodiment, a rotating electrical machine apparatus 500 includes a motor 510 and is employed as a propulsion device, as shown in FIG. 11. A load acts in a first direction (direction X1) along a rotation axis A on a rim 2 by rotational driving of the rotating electrical machine apparatus 500. A stator portion 17 is arranged such that a suction force acts in a second direction (direction X2) opposite to the first direction along the rotation axis A of the rim 2. In other words, the stator portion 17 is arranged in the direction X2 relative to a rotor portion 23.

According to the fourth embodiment, a force F17 acts in the direction X1 as the reaction force of a propulsion force on the rim 2. Furthermore, a suction force F18 to the stator portion 17 acts in the direction X2 on the rim 2 (rotor portion 23).

The remaining structure of the rotating electrical machine apparatus 500 according to the fourth embodiment is similar to that of the rotating electrical machine apparatus 100 according to the aforementioned first embodiment.

According to the fourth embodiment, the following effects are obtained.

According to the fourth embodiment, the stator portion 17 faces the rotor portion 23 along the rotation axis A, whereby the rotor portion 23 and the stator portion 17 are easily provided while an increase in the radial thickness of a duct 1 is significantly reduced or prevented, similarly to the aforementioned first embodiment. The rotor portion 23 and the stator portion 17 are aligned along the rotation axis A of the rim 2 such that a force is generated in a direction opposite to the direction of a load that acts along the rotation axis A of the rim 2 of loads that act on the rim 2 following rotation of blades 22, whereby the rim 2 is efficiently rotated.

The remaining effects of the fourth embodiment are similar to those of the aforementioned third embodiment.

Modification of Fourth Embodiment (Fourth Modification)

A modification (fourth modification) of the fourth embodiment of the present invention is now described with reference to FIG. 12. In this fourth modification, a rotating electrical machine apparatus is employed as a generator.

Figure 12:
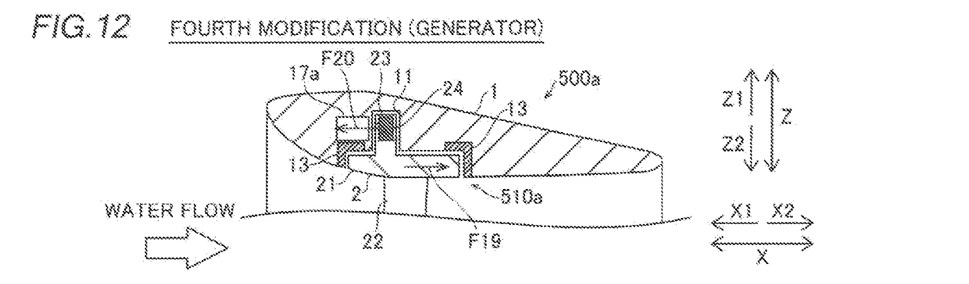
FIG. 12 is a side sectional view of a rotating electrical machine apparatus according to a modification (fourth modification) of the fourth embodiment of the present invention.

As shown in FIG. 12, a rotating electrical machine apparatus 500a according to the fourth modification includes a generator that generates electric power by rotating blades 22 according to flow of an external fluid. In other words, in the rotating electrical machine apparatus 500a, a rotor portion 23 is rotated by rotation of the blades 22, and a magnetic field is changed. A stator portion 17a is arranged in a direction X1 relative to the rotor portion 23. An electric current flows in a coil of the stator portion 17a by the change of the magnetic field, and electric power is generated.

When water flows from the direction X1 toward a direction X2, the force of the water flow is converted into the rotation force of a rim 2, and a force F19 acts in the direction X2. A suction force F20 is generated between the stator portion 17a and the rotor portion 23.

The remaining structure of the rotating electrical machine apparatus 500a according to the fourth modification is similar to that of the rotating electrical machine apparatus 500 according to the aforementioned fourth embodiment.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the single rotor portion is provided in an outer portion of the rim along the rotation axis in each of the aforementioned first to fourth embodiments, the present invention is not restricted to this. According to the present invention, as in a fifth modification shown in FIG. 13, a plurality of rotor portions may alternatively be provided in an outer portion of the rim along the rotation axis.

Figure 13:
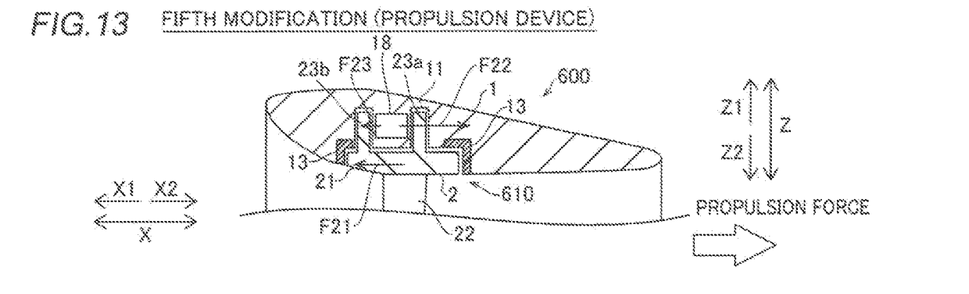
FIG. 13 is a side sectional view of a rotating electrical machine apparatus according to a fifth modification of the first to fourth embodiments of the present invention.

In the fifth modification, a rotating electrical machine apparatus 600 includes a motor 610 and is employed as a propulsion device, as shown in FIG. 13. A rotor portion 23a is provided in a direction X2 of the radial outward direction of a cylindrical portion 21 of a rim 2, and a rotor portion 23b is provided in a direction X1 of the radial outward direction of the cylindrical portion 21 of the rim 2. A stator portion 18 is provided between the rotor portions 23a and 23b along a rotation axis A (direction X). In other words, the stator portion 18 is sandwiched in between the rotor portions 23a and 23b along the rotation axis A.

A load acts in a first direction (direction X1) along the rotation axis A on the rim 2 by rotational driving of the rotating electrical machine apparatus 600. In other words, a force F21 acts in the direction X1 as the reaction force of a propulsion force on the rim 2. Furthermore, a suction force F22 between the stator portion 18 and the rotor portion 23a acts in the direction X2 on the rim 2, and a suction force F23 between the stator portion 18 and the rotor portion 23b acts in the direction X1. In this case, the suction force F22 may be larger than the suction force F23.

While the rotor portion protrudes outwardly from the outer periphery of the rim in each of the aforementioned first to fourth embodiments, the present invention is not restricted to this. According to the present invention, as in a sixth modification shown in FIG. 14, a rotor portion 23c may not protrude from the outer periphery of a rim 2.

Figure 14:
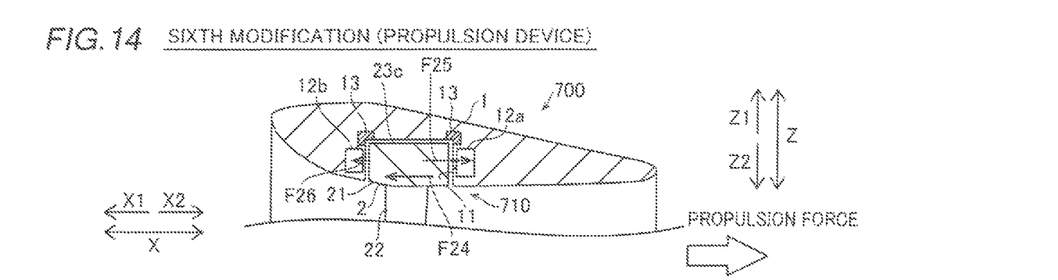
FIG. 14 is a side sectional view of a rotating electrical machine apparatus according to a sixth modification of the first to fourth embodiments of the present invention.

In the sixth modification, a load acts in a first direction (direction X1) along a rotation axis A on the rim 2 by rotational driving of a rotating electrical machine apparatus 700. In other words, a force F24 acts in the direction X1 as the reaction force of a propulsion force on the rim 2. Furthermore, a suction force F25 between a stator portion 12a and the rotor portion 23c acts in a direction X2 on the rim 2, and a suction force F26 between a stator portion 12b and the rotor portion 23c acts in the direction X1. In this case, the suction force F25 may be larger than the suction force F26.

While the rotating electrical machine apparatus is employed as the propulsion device in each of the aforementioned first to fourth embodiments and the fifth modification and the rotating electrical machine apparatus is employed as the generator in each of the aforementioned first to fourth modifications, the present invention is not restricted to this. According to the present invention, the rotating electrical machine apparatus may alternatively be employed as an apparatus used as both the propulsion device and the generator.

While the rotating electrical machine apparatus is manually turned in each of the aforementioned first to fourth embodiments, the present invention is not restricted to this. According to the present invention, the rotating electrical machine apparatus may alternatively be turned by operation of a steering wheel, a joystick, or the like through an electrically-driven device, a hydraulic power unit, or the like.

While the four blades are provided in the rim in each of the aforementioned first to fourth embodiments, the present invention is not restricted to this. According to the present invention, three or less blades may alternatively be provided, or five or more blades may alternatively be provided.

While no shaft is provided on the rotation axis of the rim in each of the aforementioned first to fourth embodiments, the present invention is not restricted to this. According to the present invention, a shaft connected to the blades may alternatively be provided on the rotation axis of the rim.

While both the duct and the rim are circumferentially and continuously provided in each of the aforementioned first to fourth embodiments, the present invention is not restricted to this. According to the present invention, both the duct and the rim may not be continuously provided by providing notched, gaps, or the like on portions of the circumferences.

While the thrust force and the suction forces are calculated and the force that acts along the rotation axis of the rim is adjusted on the basis of the thrust force and the suction forces in the aforementioned first embodiment, the present invention is not restricted to this. According to the present invention, a sensor may alternatively be provided to detect the position of the rim along the rotation axis with respect to the duct, and a force that acts along the rotation axis of the rim may alternatively be adjusted on the basis of the position of the rim.

While the rotating electrical machine apparatus is mounted on the rear portion of the boat body in each of the aforementioned first to fourth embodiments, the present invention is not restricted to this. The rotating electrical machine apparatus according to the present invention may alternatively be mounted on a front portion or a side portion of the boat body.

While the rotating electrical machine apparatus according to the present invention is mounted on the boat body in each of the aforementioned first to fourth embodiments, the present invention is not restricted to this. The rotating electrical machine apparatus according to the present invention may alternatively be mounted on an aircraft, a vehicle, or the like and be employed as a propulsion device, or the rotating electrical machine apparatus according to the present invention may alternatively be employed for an air blower, a pump, or the like.

What is claimed is:

1. A rotating electrical machine apparatus for a marine propulsion apparatus comprising:
    a cylindrical duct surrounding a stator portion, the cylindrical duct having a forward portion on one side of the stator portion and a rearward portion on another side of the stator portion, and defining a flow of water around the cylindrical duct, the forward portion further defining a recessed portion recessed radially outwardly from an inner surface of the cylindrical duct; and
    a rim arranged to be rotatable and disposed in a radial inward direction of the cylindrical duct, the rim including
        a cylindrical portion,
        a blade protruding in a radial inward direction of the cylindrical portion from an inner surface of the cylindrical portion, the blade being configured so that following rotation of the blade, a first load as a reaction force of a propulsion force acts on the rim along a rotation axis of the rim, and
        a rotor portion attached to the cylindrical portion and housed in the recessed portion, the rotor portion being provided to face the stator portion along the rotation axis of the rim, the rotor portion and the stator portion being aligned along the rotation axis of the rim and controlled to generate a force in a direction opposite to a direction of the first load as the reaction force of the propulsion force so that the first load as the reaction force of the propulsion force is offset.

2. The rotating electrical machine apparatus according to claim 1, wherein
    a second load acts in a first direction along the rotation axis on the rim, and
    the rotor portion and the stator portion are arranged and controlled such that a suction force formed between the rotor portion and the stator portion acts in a second direction opposite to the first direction along the rotation axis of the rim.

3. The rotating electrical machine apparatus according to claim 2, wherein
    the rotating electrical machine apparatus includes an electric propulsion unit including the cylindrical duct and the rim, in the electric propulsion unit, an electric power supply from an external power supply is supplied to the stator portion such that the rim is rotated with respect to the cylindrical duct, and
    the second load includes a reaction force of a propulsion force generated by the electric propulsion unit when the rim is rotated with respect to the cylindrical duct.

4. The rotating electrical machine apparatus according to claim 1, wherein the blade has a wing shape.

5. The rotating electrical machine apparatus according to claim 1, wherein the rotating electrical machine apparatus is mounted as a propulsion device on a boat body.

6. The rotating electrical machine apparatus according to claim 5, wherein the rotating electrical machine apparatus is mounted on the boat body through a bracket.

7. The rotating electrical machine apparatus according to claim 5, wherein the cylindrical duct is rotatable about a turning axis that intersects with the rotation axis of the rim.

8. The rotating electrical machine apparatus according to claim 5, wherein a sectional shape of the cylindrical duct changes along the rotation axis of the rim.

9. The rotating electrical machine apparatus according to claim 1, wherein the blade includes at least three and not more than eight blades.

10. The rotating electrical machine apparatus according to claim 1, wherein the rotor portion and the stator portion constitute a switched reluctance motor.

11. The rotating electrical machine apparatus according to claim 10, wherein the stator portion includes
- a first stator portion arranged in one direction along the rotation axis of the rim with respect to the rotor portion, and
- a second stator portion arranged in another direction along the rotation axis of the rim with respect to the rotor portion,
- the one direction being opposite the other direction.

12. The rotating electrical machine apparatus according to claim 11, further comprising a controller that adjusts an electric power supplied to the first stator portion and the second stator portion according to a direction and a magnitude of a generated propulsion force.

13. The rotating electrical machine apparatus according to claim 11, further comprising a controller that adjusts an electric power to generate
- a first suction force between the first stator portion and the rotor portion, and
- a second suction force between the second stator portion and the rotor portion,
- wherein a magnitude of the first suction force is different from a magnitude of the second suction force.

14. The rotating electrical machine apparatus according to claim 13, wherein a combined resultant force of the first suction force and the second suction force acts in a direction opposite to a reaction force of a generated propulsion force.

15. The rotating electrical machine apparatus according to claim 11, further comprising a controller configured to determine a generation direction of a propulsion force depending on an accelerating operation or a shifting operation and adjust an electric power supplied to the first stator portion and the second stator portion.

16. The rotating electrical machine apparatus according to claim 1, wherein
- the rotor portion includes a permanent magnet,
- the rotating electrical machine apparatus further comprises a suction member is provided opposite the recessed portion and separately from the stator portion so as to face the rotor portion of the rim along the rotation axis, and
- a suction force is generated between the permanent magnet of the rotor portion and the suction member.

17. The rotating electrical machine apparatus according to claim 1, wherein the stator portion is provided opposite the recessed portion.

* * * * *